(12) United States Patent
Kubo (10) Patent No.: US 7,151,564 B2
(45) Date of Patent: Dec. 19, 2006

(54) IMAGE RECORDING APPARATUS AND METHOD

(75) Inventor: Naoki Kubo, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 736 days.

(21) Appl. No.: 09/840,182

(22) Filed: Apr. 24, 2001

(65) Prior Publication Data

US 2001/0035909 A1 Nov. 1, 2001

(30) Foreign Application Priority Data

Apr. 24, 2000 (JP) ............................ 2000-122917

(51) Int. Cl.
*H04N 1/21* (2006.01)
(52) U.S. Cl. ................................... 348/231.6
(58) Field of Classification Search ............ 348/231.2, 348/231.99, 231.3, 231.6
See application file for complete search history.

(56) References Cited

U.S. PATENT DOCUMENTS

| 5,153,730 | A | * | 10/1992 | Nagasaki et al. | ......... | 348/231.6 |
| 6,288,743 | B1 | * | 9/2001 | Lathrop | .................... | 348/231.9 |
| 6,657,658 | B1 | * | 12/2003 | Takemura | .............. | 348/207.99 |
| 7,027,665 | B1 | * | 4/2006 | Kagle et al. | ................. | 382/284 |
| 2004/0085462 | A1 | * | 5/2004 | Sasaki | ..................... | 348/231.6 |

FOREIGN PATENT DOCUMENTS

| JP | 52452 | | 1/1993 |
| JP | 888790 | | 4/1996 |
| JP | 11088672 | A * | 3/1999 |

* cited by examiner

*Primary Examiner*—David Ometz
(74) *Attorney, Agent, or Firm*—Birch, Stewart, Kolasch & Birch, LLP (57) ABSTRACT

An image processing part performs image processing for processing signals outputted from an imaging device, and the image processing includes deficient pixel correction, optical black and white balance. Image data obtained at one of middle stages of the image processing is stored in an external storage medium. At this time, information indicating which middle stage the one is (image processing information) is stored in the external storage medium with the image data. The image processing information is stored in a file in which the image data is stored, or it is stored in another file.

18 Claims, 14 Drawing Sheets

《IMAGE DATA WHICH HAS BEEN PROCESSED UP TO A MIDDLE STAGE》

《RAW IMAGE DATA》

IMAGE RECORDING APPARATUS AND METHOD

BACKGROUND OF THE INVENTION

1. Field of the Invention

The present invention relates to an image recording apparatus and a method therefor, specifically to an image processing technology applied to an electronic camera or the like which stores captured image data.

2. Description of the Related Art

Japanese Patent Application Laid-open No. 8-88790 discloses a method in which shooting conditions are recorded when image data is stored and the conditions are used to reproduce the image. Japanese Patent Application Laid-open No. 5-2452 discloses a method in which information indicating whether or not image data has been compressed is stored when the image data is stored.

In case unprocessed image data is stored, a user desirably performs image processing by software of a personal computer after the storage. However, such a post-processing by the personal computer takes a long time, and thus it is inefficient.

SUMMARY OF THE INVENTION

The present invention has been developed in view of the above-described circumstances, and has as its object the provision of an image recording apparatus and a method therefor with which a user can efficiently perform a desired image processing after photographing.

In order to achieve the above-described objects, the present invention is directed to an image recording apparatus which stores, in a storage medium, image data obtained at one of middle stages of image processing for processing signals outputted from an imaging device.

According to the present invention, an optical image of a subject is photo-electrically converted into the signals by the imaging device, and the signals outputted from the imaging device are processed in order to obtain image data. The image data obtained at the desired middle stage of the image processing is stored. Thus, processing by software after the storage can be efficiently performed.

Information, that indicates which middle stage the desired middle stage is, is preferably stored in the storage medium with the image data. This makes it possible to smoothly perform the processing by the software after the storage.

The present invention is directed to an image recording apparatus, comprising: an imaging device that converts an optical image into signals; a designating device that designates one of middle stages of image processing for processing the signals outputted from the imaging device; a controlling device that obtains image data at the middle stage designated by the designating device; and a storing device that stores the image data in a storage medium.

According to the present invention, the control device obtains the image data obtained at the middle stage designated by the designating device, and the storing device stores the image data in the storage medium. This makes easy to obtain the image data at the desired middle stage.

Information, that indicates which middle stage the desired middle stage is, is stored in the storage medium with the image data. This makes it possible to more smoothly perform the processing by the software after the storage.

The information, that indicates which middle stage the desired middle stage is, is added to a file in which the image data is stored. Alternatively, the information is stored in another file.

Moreover, one of the following additional data is preferably stored in the storage medium with the information indicating which middle stage the desired middle stage is: parameter data for the image processing, processing data used for the image processing, an image processing program for processing the image data, information on the image processing program, and reduced image data of the image data.

The parameter data for the image processing is, for example, image pixel deficiency data and gamma table data. The processing data is, for example, optical black (OB) data of respective colors in optical black, gain correction data of respective colors in white balance. This makes it possible to smoothly perform the processing after the storage, and data that is substantially the same as the unprocessed data can be acquired.

The additional data is added to a file in which the image data is stored, or it is stored in another file.

Further, the present invention is directed to an image recording apparatus, further comprising a reduced image data producing device that produces reduced image data at the last stage of the image processing from the signals outputted from the imaging device; wherein the reduced image data is stored in the storage medium with the image data.

If the image data is obtained at a middle stage of the image processing, the image may not be recognized and processing for displaying the image may require a long time. In order to address such problems, a reduced image data producing device produces reduced image data like thumbnail data, and the reduced image data is stored in the storage medium with the image data. The reduced image is obtained after executing the predetermined image processing up to the final stage, and is easily displayed or reproduced. This makes it easy for the user to recognize the image.

Furthermore, image data obtained at the last stage of the image processing may be stored in the storage medium with the image data obtained at the middle stage.

The image recording apparatus may comprise a file naming device that adds a predetermined symbol to a file name of a file in which image data is stored according to a stage at which the image data has been obtained.

Symbols (characters, numbers, or a combination of them) indicating stages of the image processing are determined beforehand. When the image data is stored, the file name which includes the symbol indicating the stage is automatically added by the file naming device. Thereby up to which stage the image data within the file has been processed can be easily determined.

The present invention is directed to an image recording method, wherein: image data obtained at one of middle stages of image processing for processing signals outputted from an imaging device is stored in a storage medium; and information is stored in the storage medium with the image data, the information indicating which middle stage the one is.

The present invention is directed to an image recording method, comprising the steps of: designating one of middle stages of image processing for processing signals outputted from the imaging device; obtaining image data at the middle stage designated; and storing the image data and information in a storage medium, the information indicating which middle stage the one is.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder a preferred embodiment will be described of an image recording apparatus and a method therefor of the present invention in accordance with the accompanying drawings.

Figure 1:
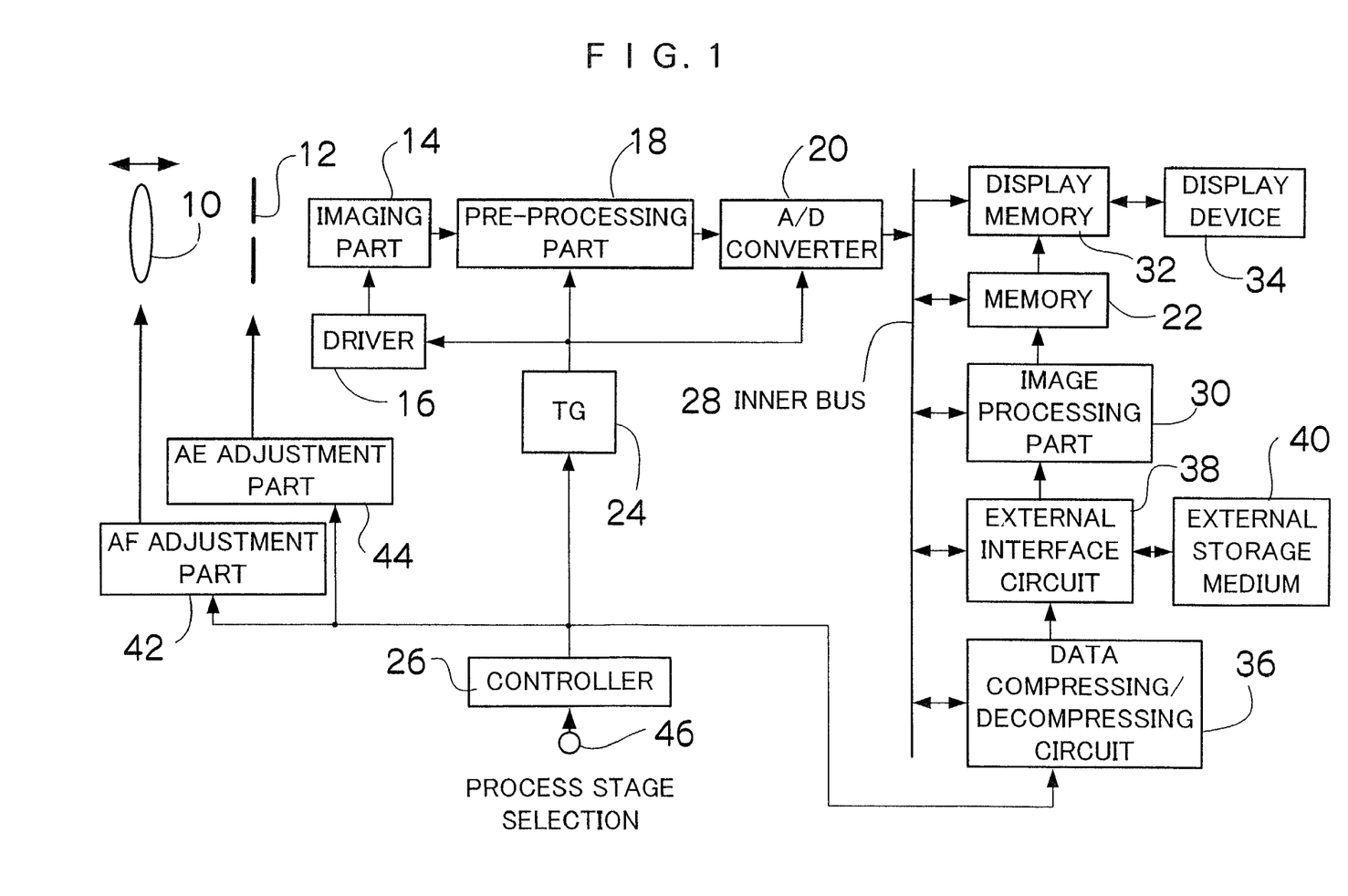
FIG. 1 is a block diagram of an electronic camera to which the present invention is applied.

FIG. 1 is a block diagram of an electronic camera to which the present invention is applied. A lens 10 comprises one lens or a few lenses; the lens 10 may be a single focal distance (fixed focus) lens, or may be a lens which can change a focal length, such as a zoom lens and a bi-focus (telephoto/wide-angle) lens.

A light passing through the lens 10 is adjusted its amount by an iris unit 12 and enters in an imaging part 14, which is a block including an imaging device for converting an optical image into an electric signal. In the present example, a CCD image sensor (hereunder called a CCD) is used as an imaging device, but an imaging device of another type such as a CMOS sensor may be used as well.

Photo sensors corresponding with light-sensitive pixels are arranged on the flat surface of a light-receiving face of the CCD. A subject image formed on the light-receiving face of the CCD is converted, by respective photo sensors, into signal charges in an amount which corresponds with an amount of entered light. The signal charges accumulated in that manner are read out by a lead gate pulse which is added from a driver 16, and are outputted in an order as voltage signals (analog image signals) corresponding with the signal charges.

A shutter drain is provided to the CCD through a shutter gate. The shutter gate is driven by the shutter gate pulse whereby the accumulated signal charges can be swept to the shutter drain. In other words, the CCD has an electronic shutter function for controlling an accumulation time of the signal charges (shutter speed) which is accumulated in the respective sensor by the shutter gate pulse.

The image signal read out from the imaging part 14 is transmitted to a pre-processing part 18 which is an analog processing part before digitizing the image signal and includes a sampling hold circuit, a color separation circuit, a gain adjusting circuit, and so forth. In the pre-processing part 18, a coefficient double sampling (CDS) and a color separation are performed on the respective R, G, and B signals, and signal levels of the respective signals are adjusted (pre-white balance processing).

The signal outputted from the pre-processing part 18 is converted into a digital signal by an A/D converter 20 and is stored in a memory 22. A timing generator (TG) 24 provides a timing signal to the driver 16, the pre-processing part 18, and the A/D converter 20 in accordance with an instruction from a controller 26, and the respective circuits are synchronized by the timing signal.

The data now stored in the memory 22 is transmitted to an image processing part 30 via an inner bus 28. The image processing part 30 comprises a gamma correction circuit, a sharpness correction circuit, a contrast correction circuit, a brightness/color difference signal producing circuit, a white balance correction circuit, and so forth, and processes the image signals in accordance with a command from the controller 26.

The image data inputted to the image processing part 30 is converted into a brightness signal (Y signal) and color difference signals (Cr and Cb signals), and at the same time is stored in the memory 22 after going through gamma correction and so on.

The image data now stored in the memory 22 is read out in accordance with an instruction from the controller 26 and is transmitted to a display memory 32. The data stored in the display memory 32 is converted into a signal in a predetermined type of display (e.g. a composite color image signal in an NTSC type), and is outputted to a display device 34, which may be a liquid display or a TV monitor or the like. In this manner, the contents of the image data are outputted to the monitor on the screen of the display device 34.

The image data of the memory 22 is periodically updated with an imaging signal outputted from the CCD, and a video signal produced from the image data is supplied to the display device 34, whereby an image captured by the CCD is displayed at a real time on the display device 34 as a moving image or otherwise images which are almost in a sequence. A photographer can confirm a photographing angle by looking at the screen of the display device 34 or by an optical finder (not shown).

A record start instruction signal is generated by pressing-down operation of a release button (not shown), and in response to receiving of the instruction signal, capturing image data for recording is started. When a mode to record data by compressing the data is selected, the controller 26 transmits a command to a compressing/decompressing circuit 36, whereby the circuit 36 compresses the image data in the memory 22 in accordance with a JPEG format or another format. The compressed image data is recorded in an external storage medium 40 such as a memory card and the like via an external interface circuit 38.

When a mode to record the uncompressed image data (uncompression mode), the compressing/decompressing circuit 36 does not compress the data, and the image data is recorded in the external storage medium 40 without compression.

In the electronic camera of the present invention, a memory card is used to store image data, specifically a smart medium (Solid-State Floppy Disk) is used. The record media is not limited to that; a PC card, a compact flash, a magnetic disk, an optical disk, an optical magnetic disk, a memory stick, and so forth, may be used. A variety of readable and writable media may be used electronically, magnetically, optically, or a combination of those formats, and a signal processing device and an interface which correspond with a medium or media to be used are applied. The electronic camera may be constructed in a way which a plurality of record media can be attached regardless of types.

At the regenerating mode, the image data read out from the external storage medium 40 is decompressed by the compressing/decompressing circuit 36, and is outputted to the display device 34 via the display memory 32.

The controller 26 includes a central processing unit (CPU), which controls the respective circuits of the system of the camera. The controller 26 is provided with a ROM and a RAM. A program processed by the CPU and the respective data and the like required for controlling are stored in the ROM, whereas the RAM is used as an operating area for the CPU to perform the respective calculations and so forth.

The controller 26 controls operations of a corresponding circuit based on an input signal received from an operation part such as a release button and other parts, and at the same time, the controller 26 controls displaying of the display device 34. The controller 26 also controls an auto focus (AF) adjustment part 42 and an auto exposure (AE) adjustment part 44.

In other words, the controller 26 performs the respective calculations such as a focus evaluation calculation and an auto exposure calculation in accordance with the imaging signal outputted from the imaging part 14, and moves the AF adjustment part 42 including a focus motor and the AE adjustment part 44 including an iris motor to a focusing position while setting them at an appropriate iris position, and at the same time controls the charge accumulation time of the CCD. In addition to the method for controlling in accordance with the imaging signal obtained from the imaging part 14, the AE and AF may be a well-known photometry sensor, or a focal distance sensor comprising an AF illumination/receiving sensors.

A camera operation part includes a stage selecting device 46 for selecting a desired stage of the image processing performed by the image processing part 30. A specific form of the stage selecting device 46 is not limited to a button switch, a dial, a lever switch, and a slide knob; a desired section may be selected also from a set menu or a selecting section with a cursor, a pointer, or a touch panel displayed on the screen of the display device 34.

The stage selecting device 46 and other operating part may be provided to the body of the camera, or a part or an entire of the operating parts may be constructed as a remote controller to be separate from the camera.

Figure 2:
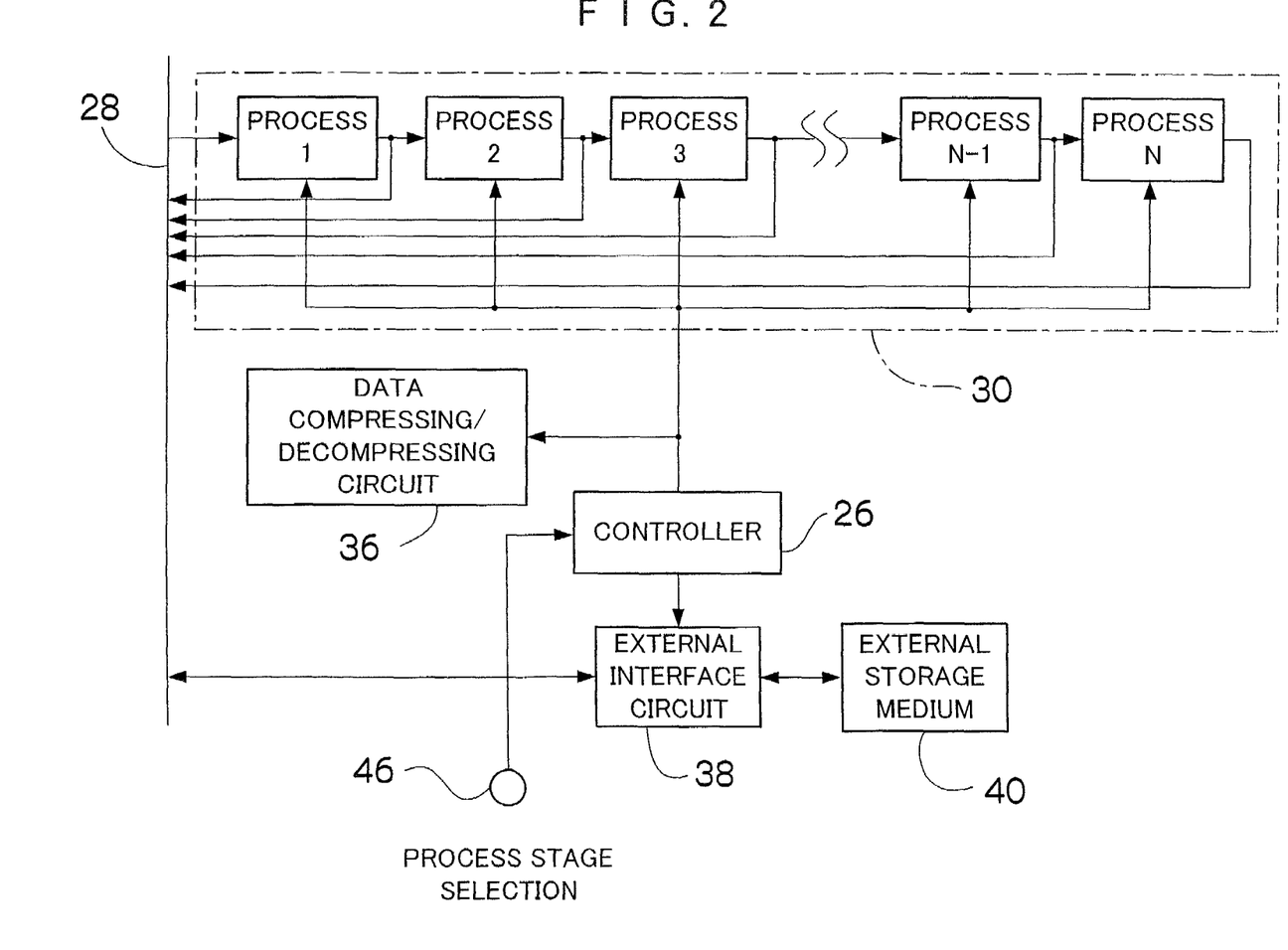
FIG. 2 is another block diagram showing a structure of an image processing part in FIG. 1.

FIG. 2 is a view showing details of the image processing part in FIG. 1. The image processing part 30 comprises Nos. 1–N blocks, which perform correction (interpolation) of the deficient pixel the CCD (hereunder called deficient pixel correction), OB, white balance, interpolation, producing signals such as brightness, color difference and RGB signals, contour emphasizing (aperture addition), special effect, and so forth.

The Nos. 1–N blocks are sequentially operated in accordance with instructions from the controller 26. Image data obtained at the stage selected by the stage selecting device 46 is stored in the external storage medium 40 via the interface circuit 38. At that point, the controller 26 stores the data indicating the stage (image processing information) in the external storage medium 40. The image processing information is stored in an image file in which the image data is stored, or it is stored in another file.

Figure 3:
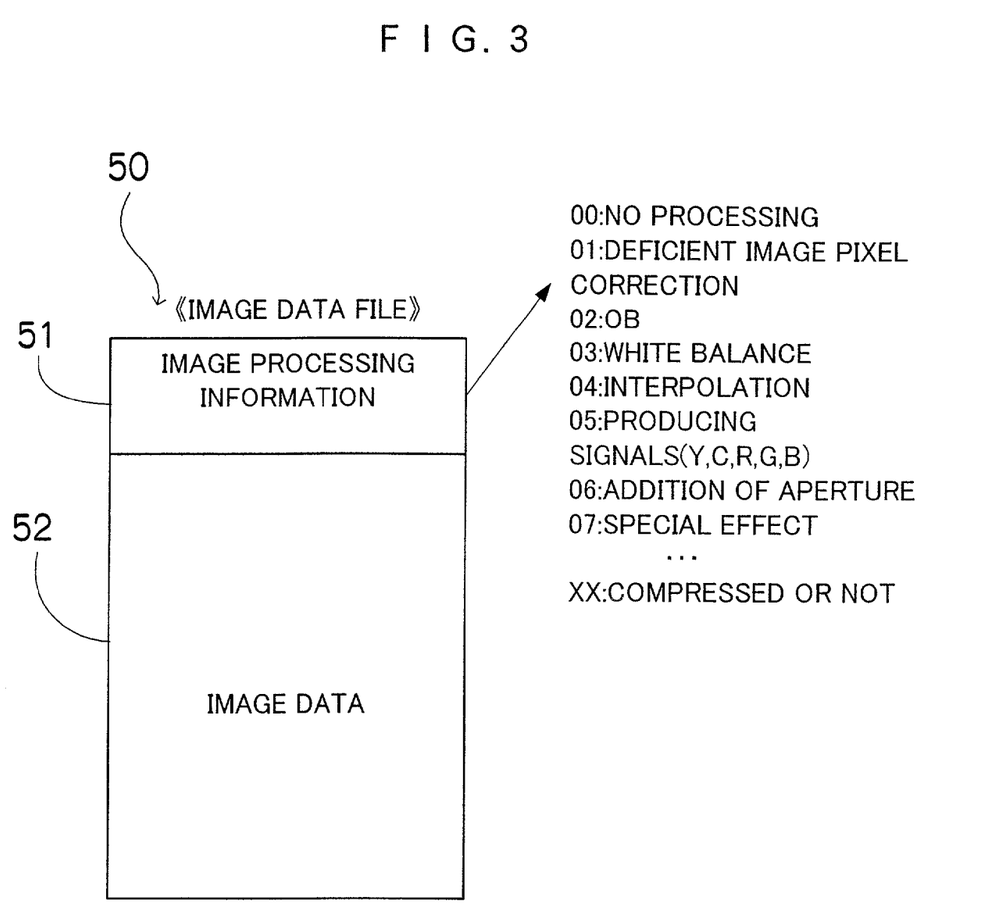
FIG. 3 is a view showing a file structure of a first example in which image data and image processing information are stored in the same file.

A recording of the data in the electronic camera which is constructed as described above is described. FIG. 3 is a schematic view showing a first example of the image data, in which an image data file 50 comprises an area 51 to store the image processing information (called an image processing information area) and an area 52 to store the image data (called an image data area). A symbol indicating a stage is written on the image processing information area 51, and the image processing information includes a code number with two digits. "00" indicates unprocessed data ("no processing") which is converted by the A/D converter of the CCD and is outputted as it is. "01" indicates deficient image pixel correction, "02" indicates the OB, "03" indicates the white balance, "04" indicates the interpolation, "05" indicates the Y, C, R, G, and B signal production, "06" indicates the aperture adding, "07" indicates the special effect, and "xx" indicates presence of data compression. In FIG. 3, the stage is indicated by a number with two digits; however, the number may have one digit or more than two digits.

The image data area 52 stores the image data (including unprocessed data) obtained at the selected stage.

Figure 4:
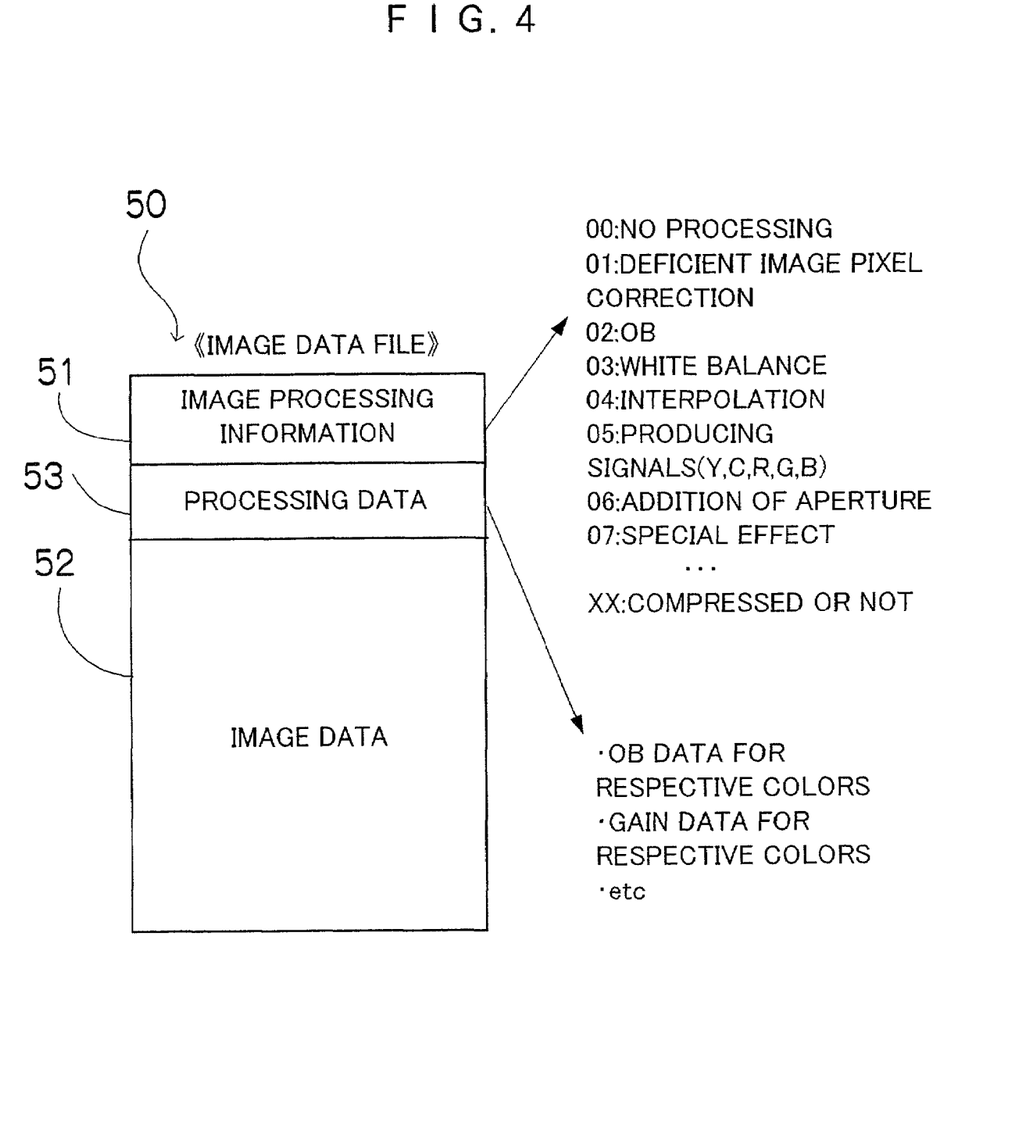
FIG. 4 is a view showing a file structure of a second example in which image data and image processing information are stored in the same file.

FIG. 4 shows a second example of the image data file, in which a process data area 53 is provided in addition to the file structure described with regard to FIG. 3, and the respective data such as the OB data and the gain data of the respective colors which are used in the image processing of the electronic camera are stored in the process data area 53.

Figure 5:
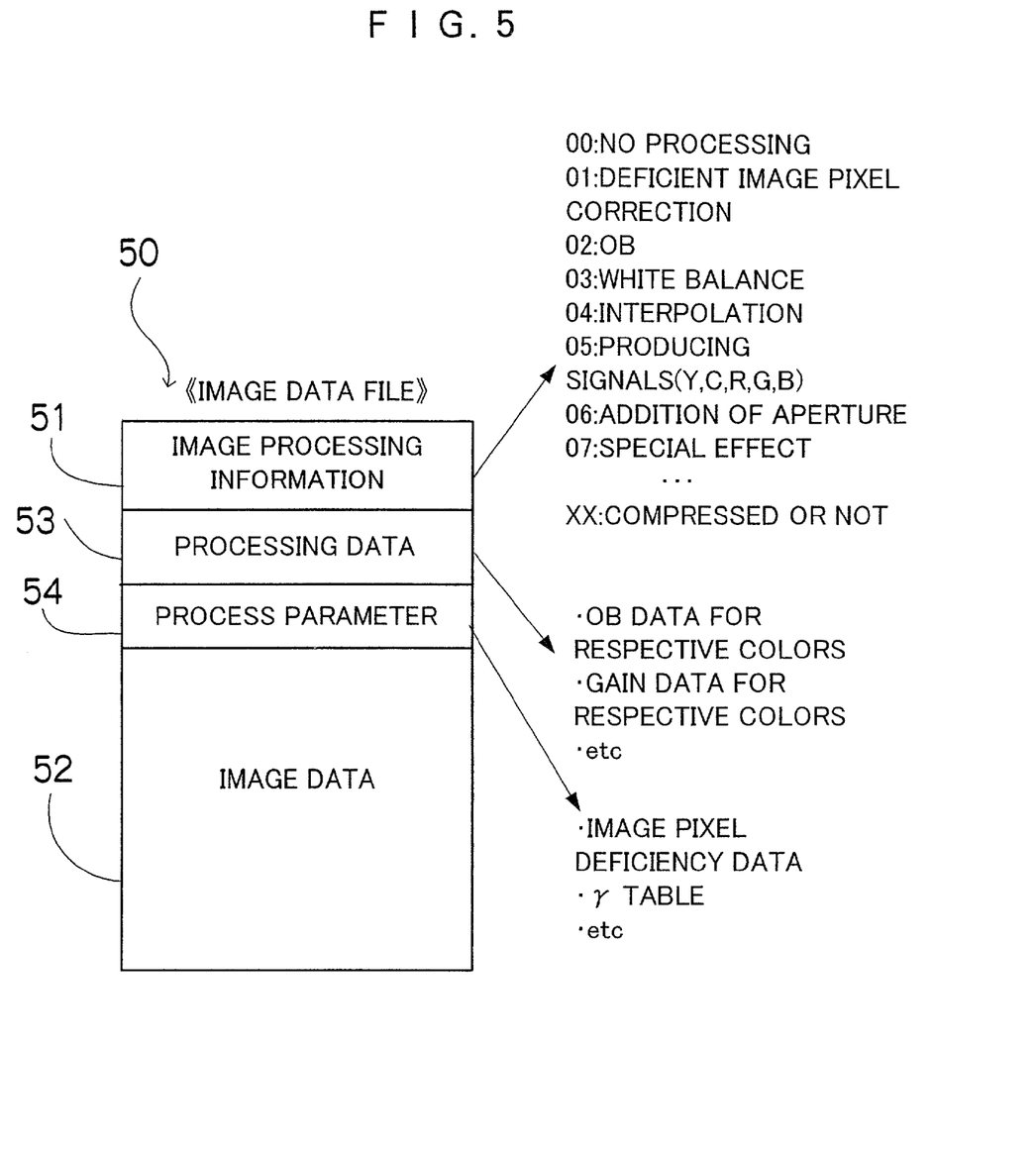
FIG. 5 is a view showing a file structure of a third example in which image data and image processing information are stored in the same file.

FIG. 5 shows a third example of the image data file, in which a process parameter area 54 is provided in addition to the file structure described with regard to FIG. 4. The process parameter area 54 stores parameters such as image pixel deficiency data and a gamma table which are referred to at the time of image processing.

Figure 6:
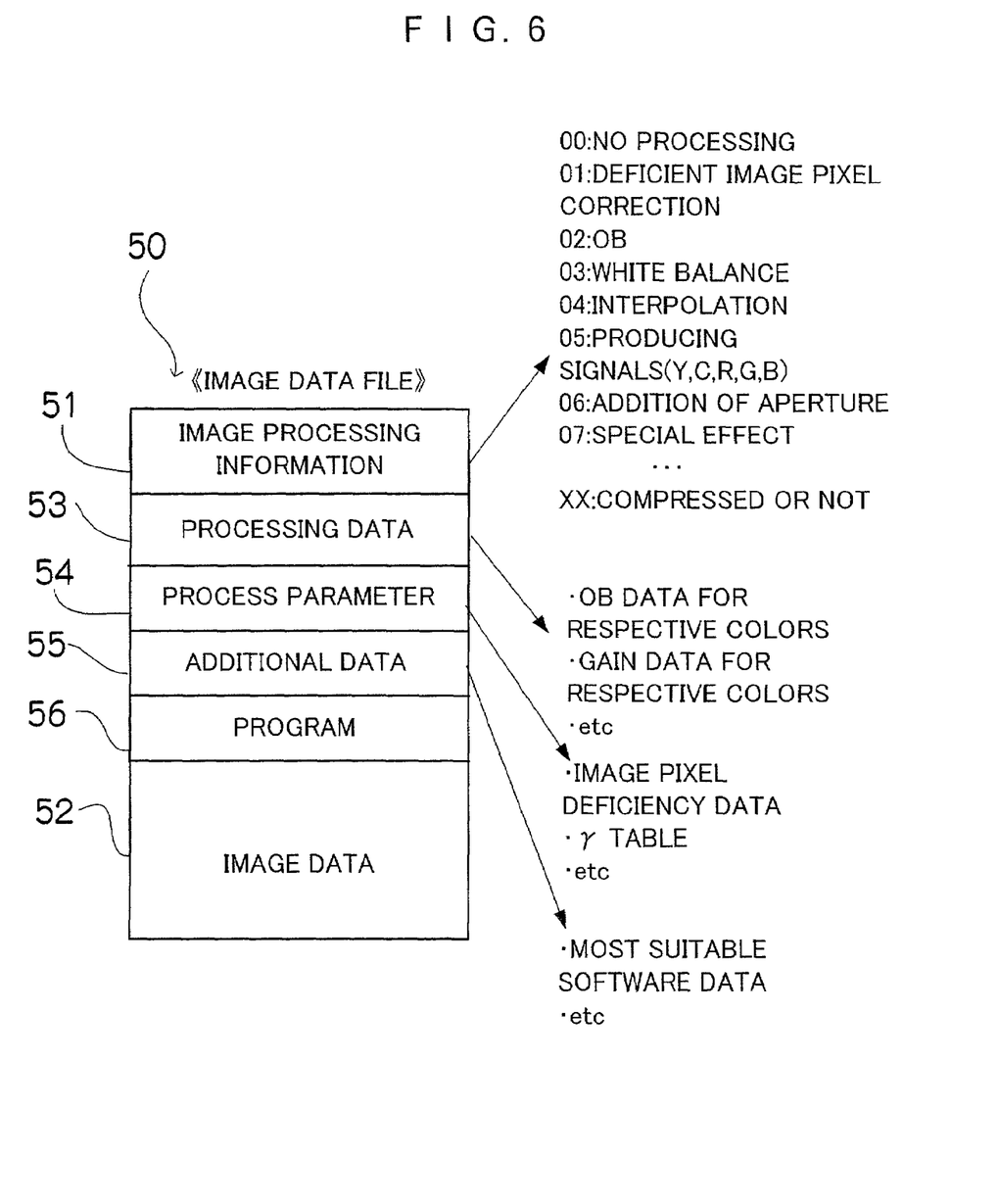
FIG. 6 is a view showing a file structure of a fourth example in which image data and image processing information are stored in the same file.

FIG. 6 shows a fourth example of the image data file, in which an additional data area 55 and a program area 56 are provided in addition to the file structure described with regard to FIG. 5. The additional data area 55 stores data of the most suitable image processing software (the data are an application name, a version data, manufacturer data, URL data of a site which can be downloaded, and so forth) which can handle the image data being processed, whereas the program area 56 stores the program itself of the image processing software.

In the manner as described above, the respective data required for image processing and the data related to the processing software are stored; thus processes after data recording is easy. Moreover, the image can be produced by automatically activating the program from the program area 56 when the image data file 50 is selected.

The recited sections and the order of the file structures are not limited to those shown in FIG. 6; deletion, addition, or exchanging of the recited sections, and altering the order of recitation are allowed.

Figure 7:
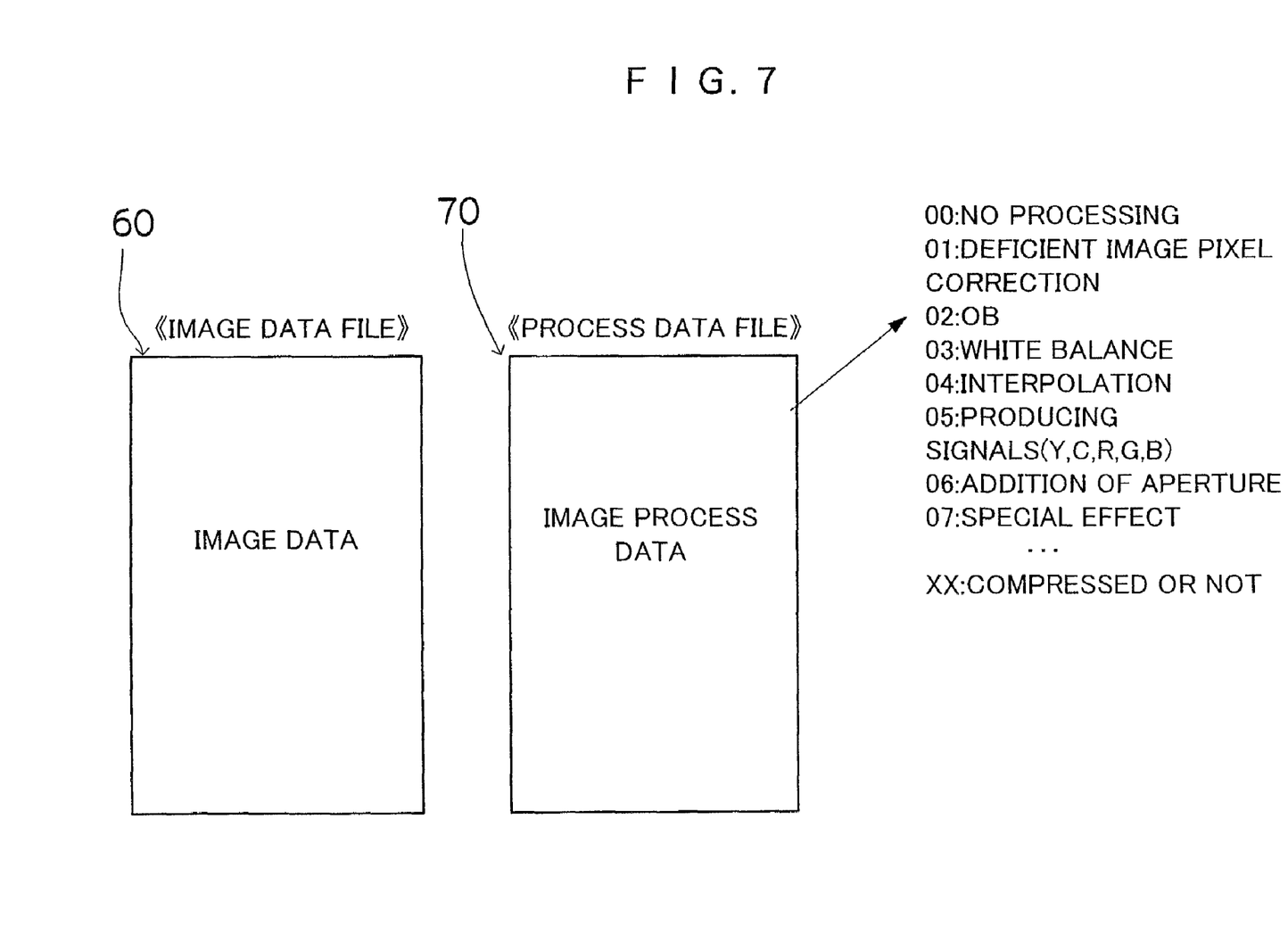
FIG. 7 is a view showing a file structure of a first example in which an image data file and a processing data file are recorded separately.

In FIGS. 3–6, the image data, the processing data, and the like are stored in one image data file 50; however, as seen from FIG. 7, constructing the image data file 60 and the process data file 70 as separate files is also possible. Since the image data file 60 which stores the image data and the processing data file 70 which stores the image processing information related to the image data are linked to each other, the process data file 70 can be accessed from the image data file 60 whenever necessary, and in contrary, the image data file 60 can be accessed from the process data file 70.

Figure 8:
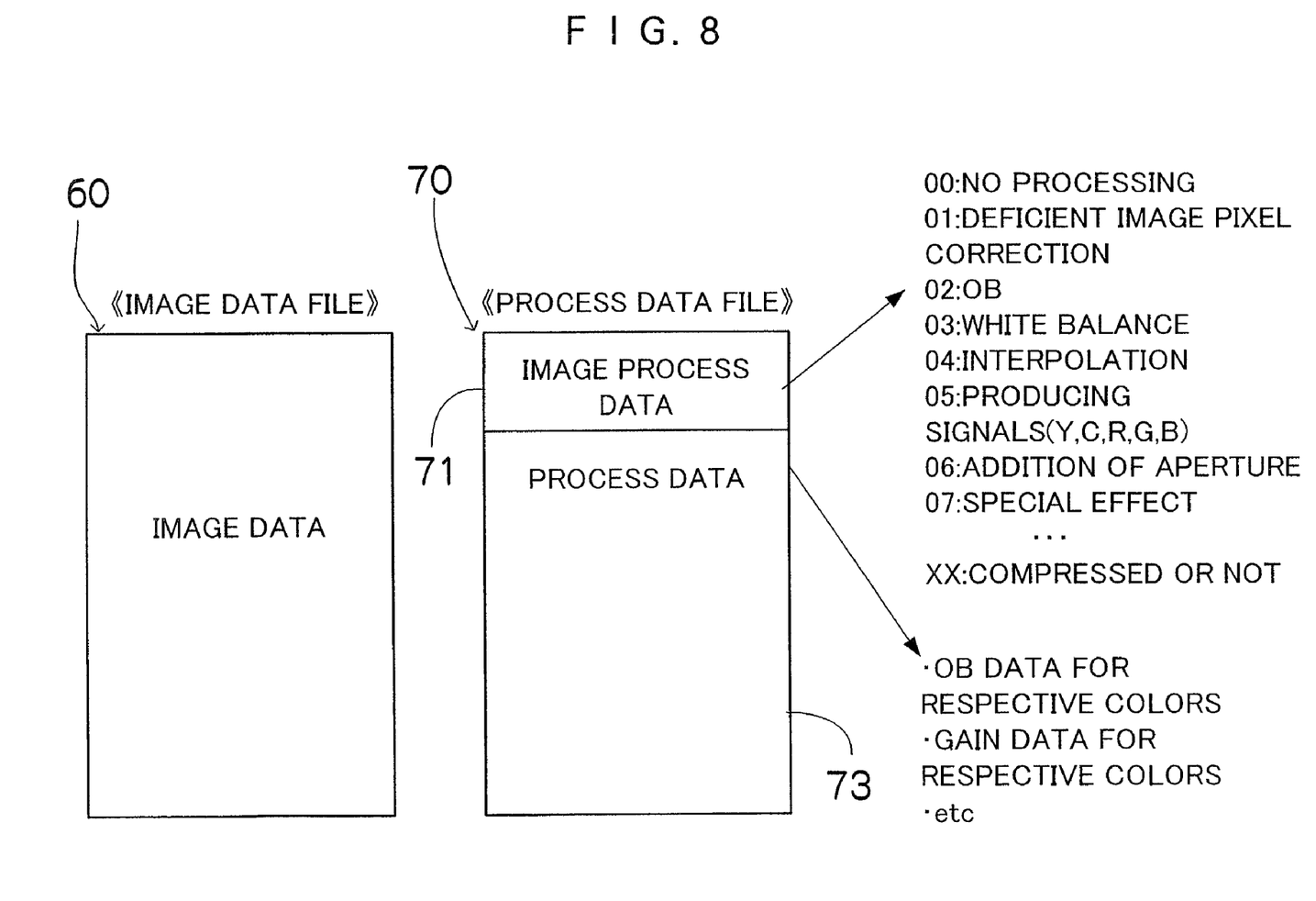
FIG. 8 is a view showing a file structure of a second example in which the image data file and the processing data file are recorded separately.
Figure 9:
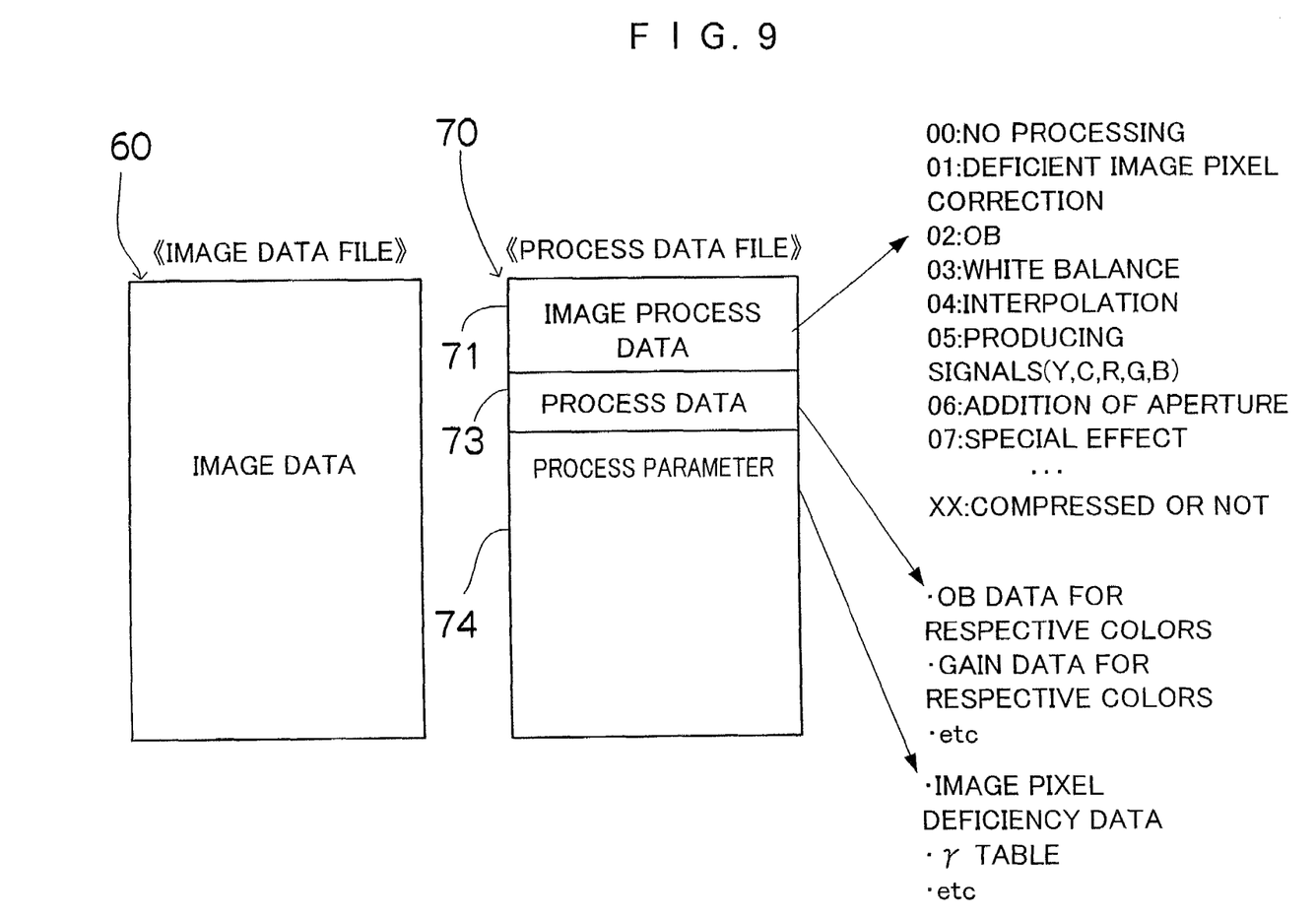
FIG. 9 is a view showing a file structure of a third example in which the image data file and the processing data file are recorded separately.
Figure 10:
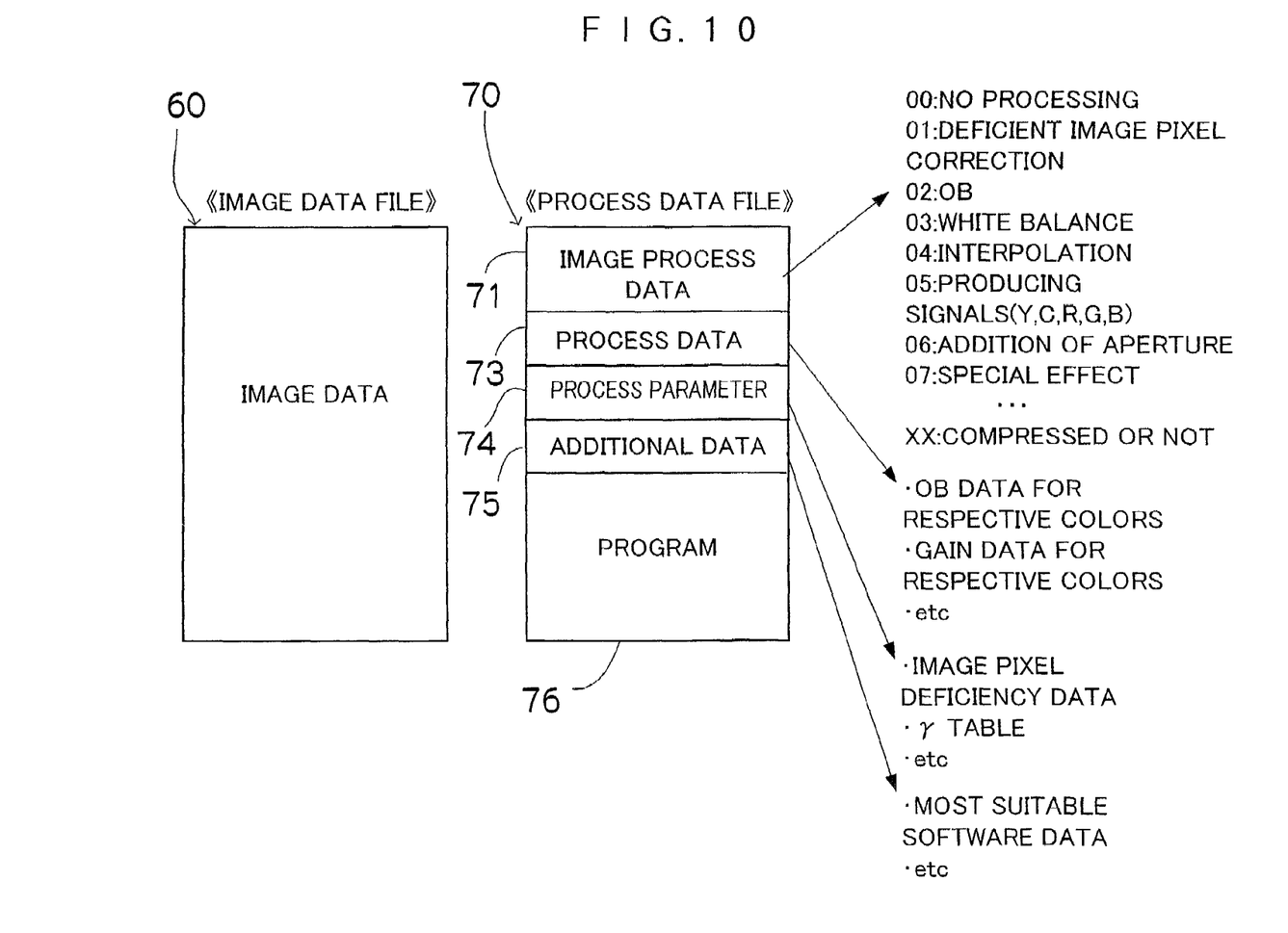
FIG. 10 is a view showing a file structure of a fourth example in which the image data file and the processing data file are recorded separately.

The structure of a file is not limited to the one of the process data file 70 in FIG. 7; as seen from FIG. 8, providing a process data area 73 in addition to the image processing information area 71, or adding a process parameter area 74 as seen from FIG. 9, or providing an additional data area 75 as seen from FIG. 10 is also allowed, and moreover a program area 76 may be provided as described with regard to FIG. 6. In the same manner as described with regard to FIG. 6, deletion, addition, or exchanging of the recited sections, and altering the order of recitation are allowed.

Figure 11:
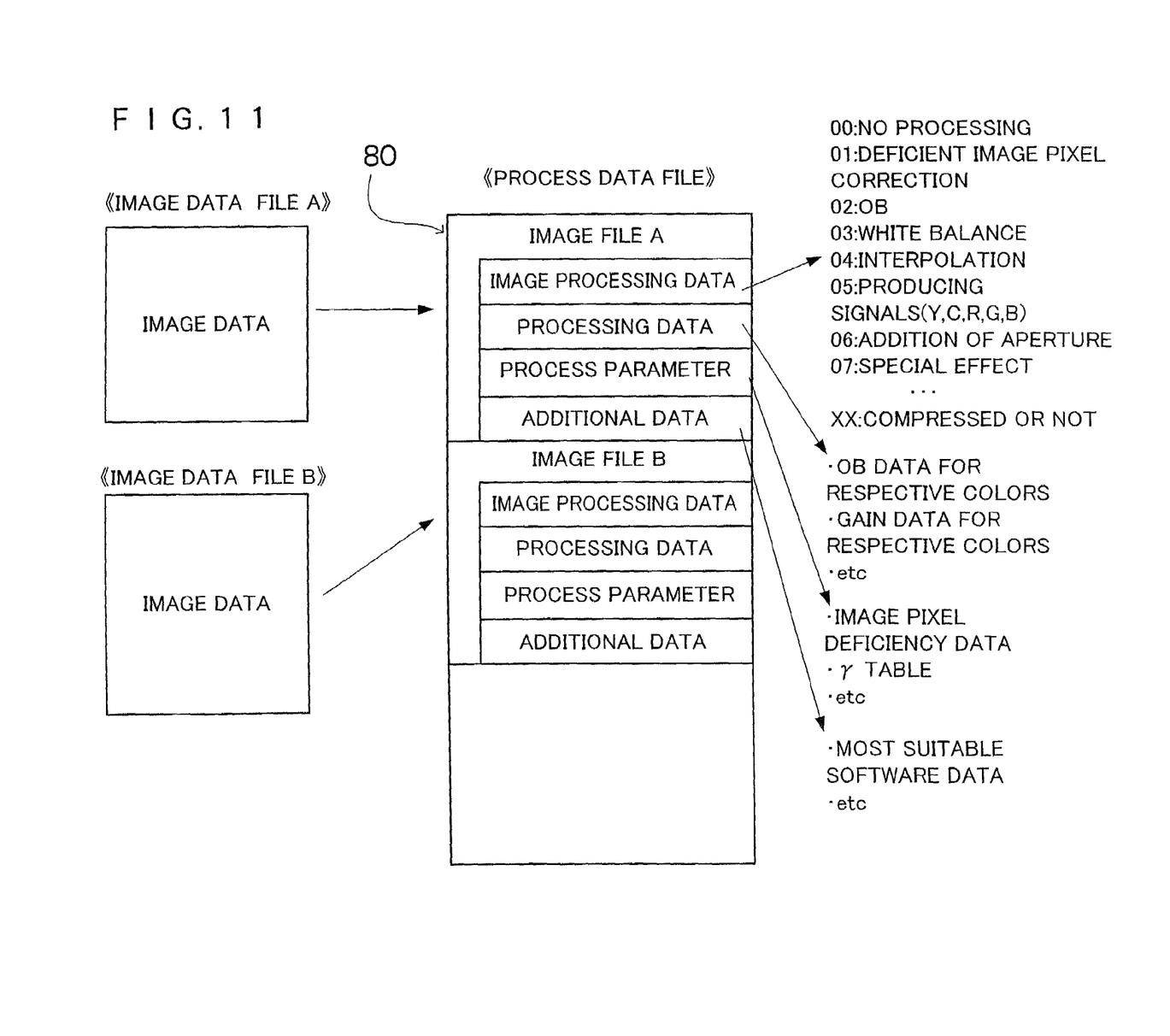
FIG. 11 is a view showing a file structure of an example in which the image processing information and so forth related to a plurality of image data files are recorded in one processing data file.

Preparation of one process data file 70 with respect to one image data file 60 is described through FIGS. 7–10; however, as seen from FIG. 11, a process associated data related to a plurality of image data may be stored in one process data file. As a result, when an image data file A is produced, the process associated data related to the image file A (predetermined sections among the data such as the image processing information, process data, process parameter, additional data, and image processing program) is written in a process data file 80.

Subsequently, when an image data file B is produced, the process associated data related to the image data file B is written in the process data file 80. In that manner, the process associated data related to the plurality of image data file are summarized and stored in one process data file.

In response to addition or deletion of the image data file, the process data file 80 is automatically corrected. When the image data file on the same external recording medium 40 is deleted, the process associated data related to the file is also deleted from the process data file 80.

Figure 12:
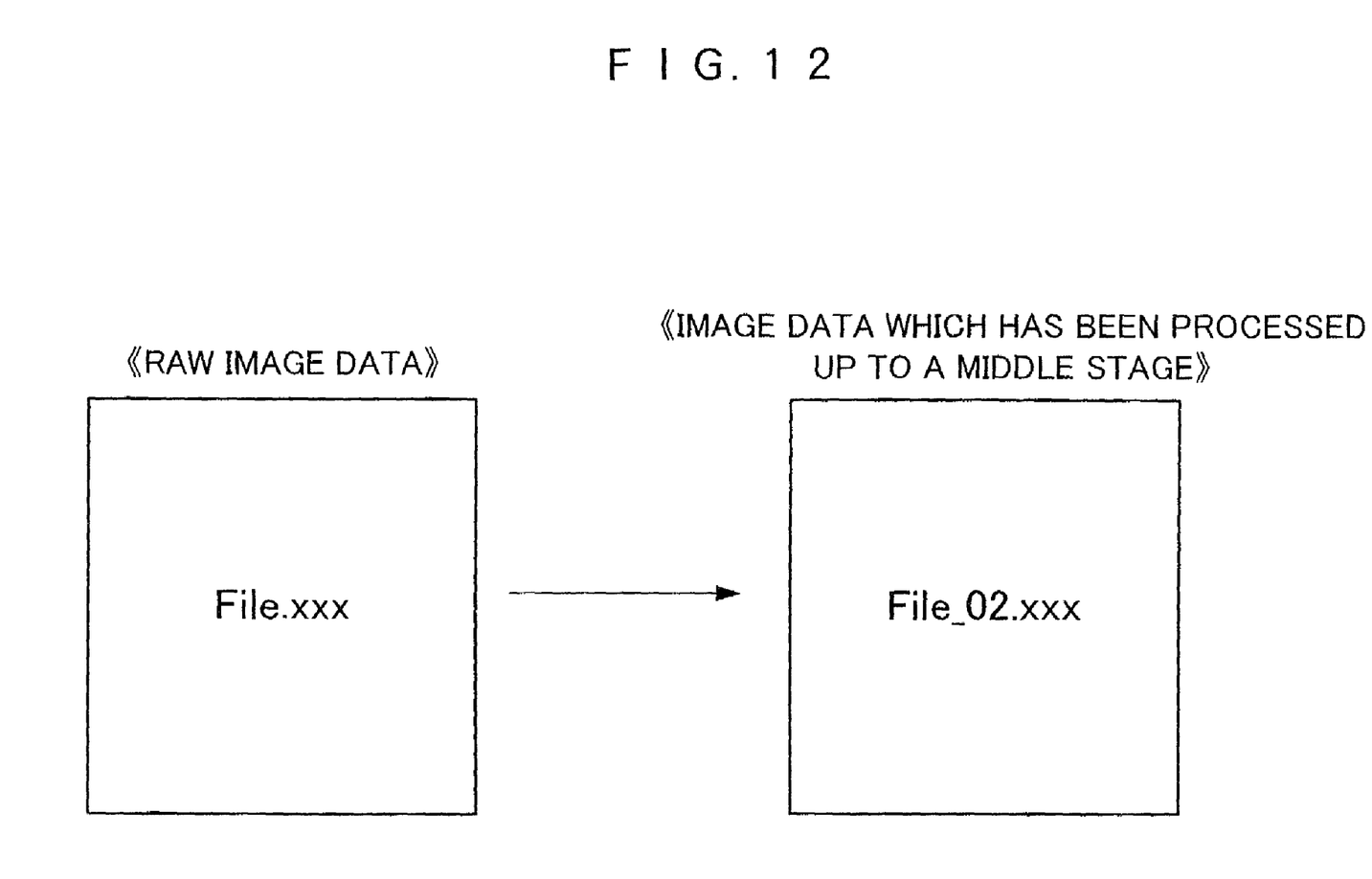
FIG. 12 is a view showing an example in which a symbol indicating a stage is added to a file name.

Further, adding a symbol indicating the stage to a file name of a file with each structure described above is also preferable. When recording an image data file in the external recording medium 40, the controller 26 automatically adds a file name. At that time, a symbol indicating a stage is added to the file name corresponding with the stage of the image.

For example, as seen from FIG. 12, a file with the image data processed completely is named as "File.xxx", whereas a file with image data after the OB is named as "File_02.xxx". The number with two digits described with regard to FIG. 3 is used as a symbol indicating the stage. The number is used in the present invention; however, each number may have more than two digits, or just one digit, whenever necessary. "xxx" is a series of characters indicating an extension.

Figure 13:
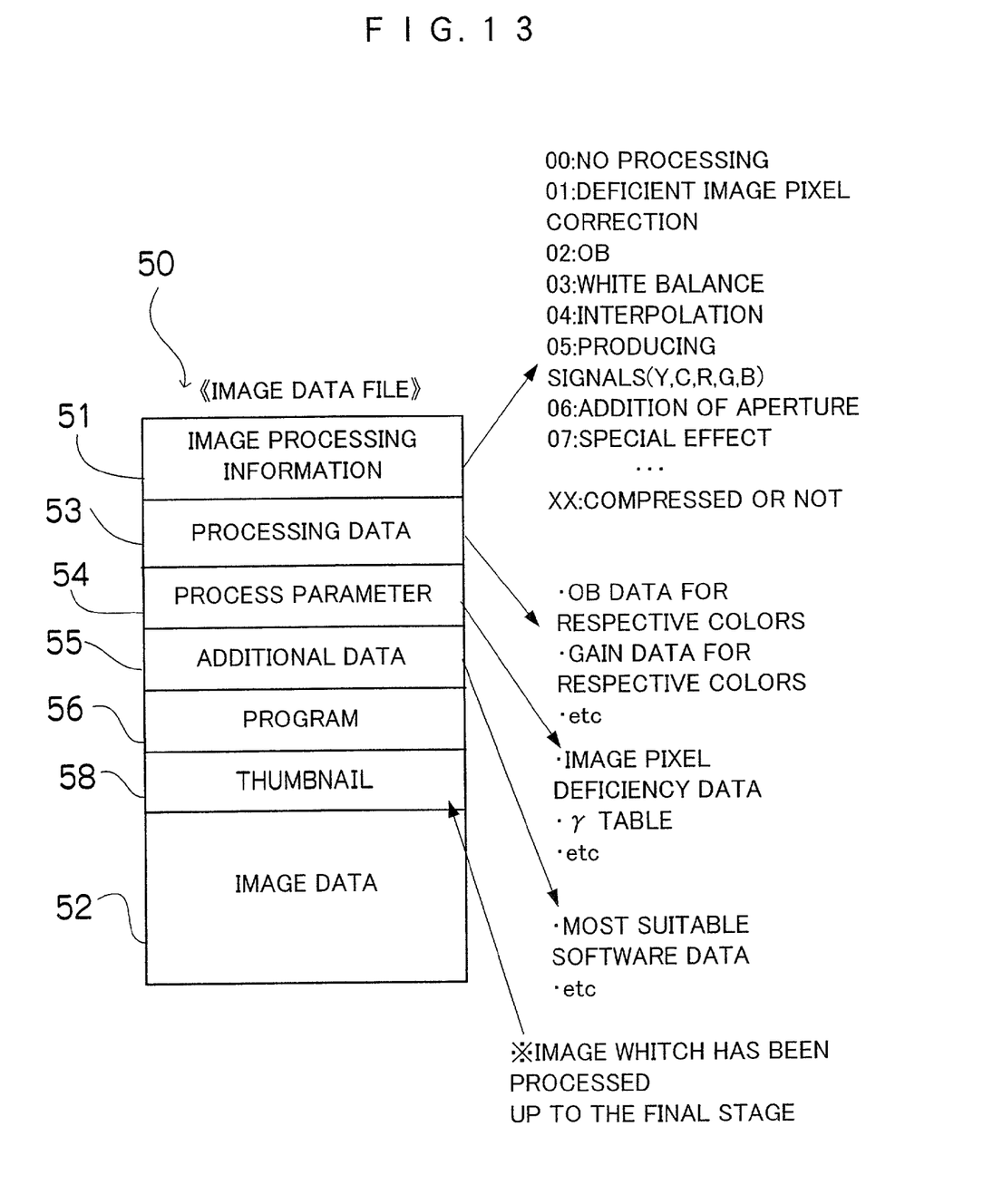
FIG. 13 is a view showing a file structure of an example in which a thumbnail is added in the image data file.

FIG. 13 shows an example of still another file structure. As seen from FIG. 13, a thumbnail storage area 58 is provided within the image data file 50, to which the data of the thumbnail may be added. The thumbnail is produced based on the image data which have been processed up to the final stage. Thus, the image processing part 30 performs the image processing up to the final stage according to the image signals obtained from the imaging part 14, and produces original image data. Then, thumbnail data of a regular size (e.g. 160×120 or 80×60) is produced by removing some of the pixels from the original image data.

The thumbnail produced in the above-described manner is stored in the same file as the place where the image data which has been processed up to a middle stage is stored. The thumbnail can be displayed at a high speed, thus the image contents of the image data file 50 can be easily determined.

Figure 14:
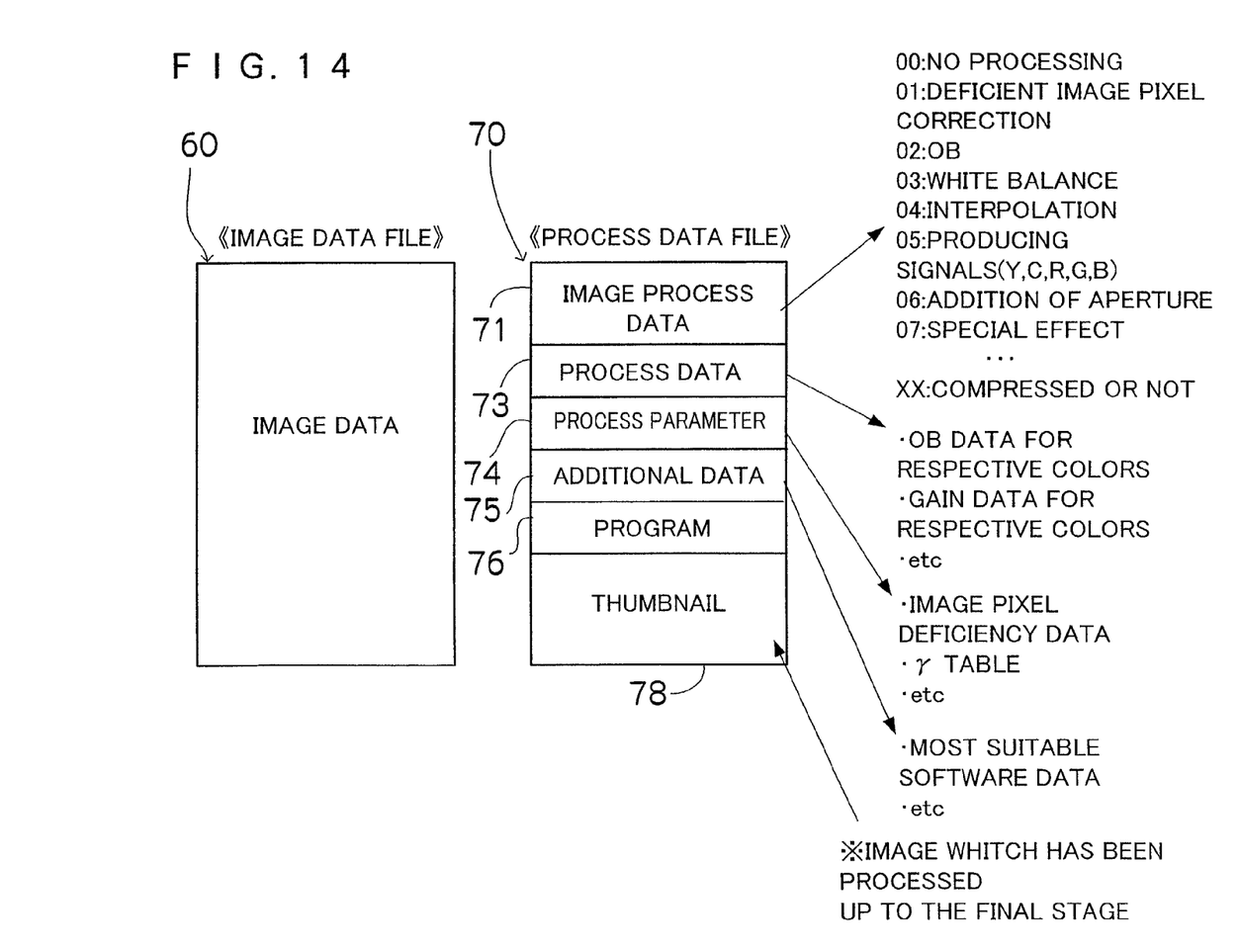
FIG. 14 is a view showing a file structure of an example in which a thumbnail is added in the image data file.

Further, as seen from FIG. 14, if the image data file 60 and the processing data file 70 are recorded as the separate files, a thumbnail storage area 78 is provided in the processing data file 70, and the data of the thumbnail may be stored in the thumbnail storage area 78.

In the embodiment of the present invention, not only the image data obtained at a middle stage of the image processing but also the image data obtained after executing the image processing up to the final stage may be recorded in combination. A storage medium for recording the image data is not only a removable medium but also an inner memory of a camera, a built-in hard disk, an external recording device, and so forth, in a variety of forms, or a combination of them may be used. When using a memory form such as the inner memory, a communication interface is provided for taking out the image data.

In the above-described examples, a camera for photographing a still image is mentioned; however, the present invention can be applied to a camera for taking a moving image, or a camera which takes both still and moving image. An application range of the present invention is not limited to an electronic camera; the present invention can be widely applied to a system comprising equipment with an input device and a storage device for the image data, or a combination of equipment.

As has been described above, according to the image recording apparatus and the method therefor of the present invention, a device with a function which can record data at a middle stage of the image processing is provided to the image recording apparatus such as a camera; thus the data processing with a software after recording can be efficiently performed. In particular, the image data obtained at a middle stage of the image processing as well as the data indicating the stage, the parameter required for the image processing, the processing data, the image processing program, and the data related to the program are recorded, whereby the processing by the software afterward can be smoothly performed by using the additional data.

Moreover, in response to the image stage performed by the apparatus of the present invention, a predetermined symbol is added to a file name of the image data file, whereby up to which stage the image data in the file has been processed can be easily determined from the file name.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:
  an image device that captures image data;
  an image processing section that processes a plurality of middle stages of image processing which is accomplished after capturing of the image and prior to the image data being converted for display on a display device; and a storage device that stores in a storage medium, image data obtained at one of said plurality of middle stages of image processing for processing signals outputted from said imaging device, the image data obtained at completion of the image processing at each of the plurality of middle stages being separately stored and separately identifiable in said storage medium, where thumbnail data of the image data is stored in a same file as the image data.

2. The image recording apparatus as defined in claim 1, wherein information is stored in the storage medium with the image data, the information indicating which middle stage the one is.

3. The image recording apparatus as defined in claim 2, wherein the information is added to the file in which the image data is stored.

4. The image recording apparatus as defined in claim 2, wherein one of the following additional data is stored in the storage medium with the information: parameter data for the image processing, processing data used for the image processing, an image processing program for processing the image data, and information on the image processing program.

5. The image recording apparatus as defined in claim 4, wherein the additional data is added to the file in which the image data is stored.

6. The image recording apparatus as defined in claim 1, further comprising a thumbnail producing device that produces reduced image data at a last stage of the image processing from the signals outputted from the imaging device.

7. The image recording apparatus as defined in claim 1, wherein image data obtained at a last stage of the image processing is stored in the storage medium.

8. The image recording apparatus as defined in claim 1, further comprising a file naming device that adds a predetermined symbol to the file name of a file in which image data is stored according to a stage at which the image data has been obtained.

9. An image recording apparatus, comprising:
an imaging device that converts an optical image into signals;
a designating device by which a user designates a desired processing stage out of an image processing sequence to which a plurality of processing stages are sequentially performed, for processing the signals outputted from said imaging device, the plurality of processing stages being performed prior to display of the signal on a display device;
a controlling device that obtains image data at the stage designated by the designating device; and
a storing device that stores the image data and thumbnail data of the image data in a same file in a storage medium.

10. The image recording apparatus as defined in claim 9, wherein information is stored in the storage medium with the image data, the information indicating which processing stage the image data has been processed.

11. The image recording apparatus as defined in claim 10, wherein the information is added to the file in which the image data is stored.

12. The image recording apparatus as defined in claim 10, wherein one of the following additional data is stored in the storage medium with the information: parameter data for the image processing, processing data used for the image processing, an image processing program for processing the image data, and information on the image processing program.

13. The image recording apparatus as defined in claim 12, wherein the additional data is added to the file in which the image data is stored.

14. The image recording apparatus as defined in claim 9, further comprising a thumbnail producing device that produces a thumbnail at a last stage of the image processing from the signals outputted from the imaging device.

15. The image recording apparatus as defined in claim 9, wherein image data obtained at a last stage of the image processing is stored in the storage medium.

16. The image recording apparatus as defined in claim 9, further comprising a file naming device that adds a predetermined symbol to the file name of a file in which image data is stored according to each stage at which the image data has been obtained.

17. An image recording method, comprising:
processing image data obtained at one of a plurality of middle stages of image processing for processing signals outputted from an imaging device, the processing of the one of a plurality of middle stages being accomplished prior to display on a display device;
storing separately in a storage medium, the image data obtained at completion of the image processing at each of the plurality of middle stages; and
storing, in the storage medium, information with the image data and a thumbnail of the image data in a same file, the information indicating from which middle stage of the plurality of middle stages the image data was obtained.

18. An image recording method, comprising the steps of:
designating, by a user, a desired processing stage out of an image processing sequence to which a plurality of processing steps are sequentially performed, for processing signals outputted from an imaging device, the plurality of processing stages being performed prior to display of the signals on a display device;
obtaining image data at the stage designated; and
storing the image data, a thumbnail of the image data and information in a same file in a storage medium, the information indicating to which processing stage the image data has been processed.

* * * * *